US011939480B2

United States Patent
Priedeman, Jr.

(10) Patent No.: US 11,939,480 B2
(45) Date of Patent: Mar. 26, 2024

(54) WATER DISPERSIBLE SULFONATED THERMOPLASTIC COPOLYMER FOR USE IN ADDITIVE MANUFACTURING

(71) Applicant: Stratasys, Inc., Eden Prairie, MN (US)

(72) Inventor: William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 272 days.

(21) Appl. No.: 17/283,819

(22) PCT Filed: Oct. 10, 2019

(86) PCT No.: PCT/US2019/055694
§ 371 (c)(1),
(2) Date: Apr. 8, 2021

(87) PCT Pub. No.: WO2020/077127
PCT Pub. Date: Apr. 16, 2020

(65) Prior Publication Data
US 2021/0348010 A1      Nov. 11, 2021

Related U.S. Application Data

(60) Provisional application No. 62/743,997, filed on Oct. 10, 2018.

(51) Int. Cl.
*C09D 11/107*       (2014.01)
*B29C 64/118*      (2017.01)
(Continued)

(52) U.S. Cl.
CPC ............ *C09D 11/107* (2013.01); *B29C 64/40* (2017.08); *B33Y 70/00* (2014.12); *C09D 11/54* (2013.01);
(Continued)

(58) Field of Classification Search
CPC ........ B29K 2995/0062; B29K 2033/12; B29K 2105/0085; C09D 11/107; C09D 11/54;
(Continued)

(56) References Cited

U.S. PATENT DOCUMENTS 2,696,482 A   12/1954  Pease
3,296,204 A    1/1967  Caldwell
(Continued)

FOREIGN PATENT DOCUMENTS

CA        3052023 A1     8/2018
CN       107206673 A     2/2015
(Continued)

OTHER PUBLICATIONS

Communication pursuant to Article 94(3) EPC from corresponding European Patent Application No. 18797278.1, dated Oct. 6, 2021.
(Continued)

*Primary Examiner* — Galen H Hauth
*Assistant Examiner* — Inja Song
(74) *Attorney, Agent, or Firm* — Peter J. Ims; Westman, Champlin & Koehler, P.A.

(57) ABSTRACT

A sulfonated water-dispersible thermoplastic copolymer material for use as a support material in an additive manufacturing process is made by a method comprising providing a selected thermoplastic copolymer having an acid or an anhydride group; esterifying the acid group of the selected thermoplastic copolymer with a hydroxyl-functionalized sulfonate salt, or amidizing the acid group of the selected thermoplastic copolymer with an amine sulfonate salt, or imidizing the anhydride group of the selected thermoplastic copolymer with an amine sulfonate salt. The esterification, the amidization or the imidization results in a sulfonated water thermoplastic dispersible copolymer having a glass transition temperature suitable to provide an effective sup-
(Continued)

port during the additive manufacturing process and wherein the sulfonated water-dispersible thermoplastic copolymer will disperse in tap water in less than 1 hour.

16 Claims, 3 Drawing Sheets

(51) Int. Cl.
    *B29C 64/40*         (2017.01)
    *B29K 33/00*         (2006.01)
    *B29K 105/00*       (2006.01)
    *B33Y 10/00*         (2015.01)
    *B33Y 70/00*         (2020.01)
    *C09D 11/54*        (2014.01)
(52) U.S. Cl.
    CPC ......... *B29C 64/118* (2017.08); *B29K 2033/12* (2013.01); *B29K 2105/0085* (2013.01); *B29K 2995/0062* (2013.01); *B33Y 10/00* (2014.12)
(58) Field of Classification Search
    CPC ....... B29C 64/40; B29C 64/118; B33Y 70/00; B33Y 10/00; C08F 8/44; C08F 8/48; C08F 220/14; C08F 222/08; C08F 220/06; C08F 8/14; C08F 8/30
    See application file for complete search history.

(56) References Cited

U.S. PATENT DOCUMENTS

| | | | |
|---|---|---|---|
| 3,779,993 | A | 12/1973 | Kibler et al. |
| 4,304,901 | A | 12/1981 | O'Neill et al. |
| 4,746,717 | A | 5/1988 | Larson |
| 4,801,388 | A * | 1/1989 | Fong ......................... C02F 5/12 526/287 |
| 4,855,384 | A | 8/1989 | Larson |
| 4,863,538 | A | 9/1989 | Deckard |
| 4,931,510 | A | 6/1990 | Sackman et al. |
| 5,132,143 | A | 7/1992 | Deckard |
| 5,204,055 | A | 4/1993 | Sachs et al. |
| 5,369,210 | A | 11/1994 | George et al. |
| 5,503,785 | A | 4/1996 | Crump et al. |
| 5,679,754 | A | 10/1997 | Larson et al. |
| 6,004,124 | A | 12/1999 | Swanson et al. |
| 6,067,480 | A | 5/2000 | Stuffle et al. |
| 6,070,107 | A | 5/2000 | Lombardi et al. |
| 6,228,923 | B1 | 5/2001 | Lombardi et al. |
| 6,310,132 | B1 * | 10/2001 | Sackmann ............ C08F 251/00 524/742 |
| 6,437,034 | B2 | 8/2002 | Lombardi et al. |
| 6,547,995 | B1 | 4/2003 | Comb |
| 6,645,412 | B2 | 11/2003 | Priedeman, Jr. |
| 6,680,364 | B1 | 1/2004 | Linemann |
| 7,122,246 | B2 | 10/2006 | Comb et al. |
| 7,384,255 | B2 | 6/2008 | LaBossiere et al. |
| 7,604,470 | B2 | 10/2009 | LaBossiere et al. |
| 7,625,200 | B2 | 12/2009 | Leavitt |
| 7,896,209 | B2 | 3/2011 | Batchelder et al. |
| 8,153,182 | B2 | 4/2012 | Comb et al. |
| 8,221,858 | B2 | 7/2012 | Mannella et al. |
| 8,419,996 | B2 | 4/2013 | Swanson et al. |
| 8,488,994 | B2 | 7/2013 | Hanson et al. |
| 8,647,102 | B2 | 2/2014 | Swanson et al. |
| 8,879,957 | B2 | 11/2014 | Hanson et al. |
| 8,926,882 | B2 | 1/2015 | Batchelder et al. |
| 9,399,691 | B2 | 7/2016 | Ruggieri et al. |
| 9,423,756 | B2 | 8/2016 | Hanson et al. |
| 9,523,934 | B2 | 12/2016 | Orrock et al. |
| 9,557,661 | B2 | 1/2017 | Martin |
| 9,777,090 | B2 | 10/2017 | Ruggieri et al. |
| 10,100,168 | B2 | 10/2018 | Bayer et al. |
| 10,308,743 | B2 | 6/2019 | Ruggieri |
| 2005/0004282 | A1 | 1/2005 | Priedeman et al. |
| 2008/0207833 | A1 | 8/2008 | Bear et al. |
| 2011/0095444 | A1 | 4/2011 | Haile et al. |
| 2013/0077996 | A1 | 3/2013 | Hanson et al. |
| 2013/0077997 | A1 | 3/2013 | Hanson et al. |
| 2013/0186549 | A1 | 7/2013 | Comb et al. |
| 2013/0186558 | A1 | 7/2013 | Comb et al. |
| 2013/0192779 | A1 | 8/2013 | Parker et al. |
| 2015/0024316 | A1 | 1/2015 | Orrock et al. |
| 2015/0227062 | A1 | 8/2015 | Martin |
| 2017/0022341 | A1 | 1/2017 | Bayer et al. |
| 2017/0232684 | A1 | 8/2017 | Yoshimura et al. |
| 2017/0240675 | A1 | 8/2017 | Yoshimura et al. |
| 2017/0369622 | A1 | 12/2017 | Inouble et al. |
| 2018/0009160 | A1 | 1/2018 | Sawada et al. |
| 2018/0030234 | A1 | 2/2018 | Priedeman, Jr. |
| 2018/0043627 | A1 | 2/2018 | Barclay et al. |
| 2018/0050495 | A1 | 2/2018 | Stolyarov et al. |
| 2018/0142077 | A1 | 5/2018 | Kimura et al. |
| 2018/0179332 | A1 | 6/2018 | Priedeman, Jr. |
| 2020/0031993 | A1 | 1/2020 | Priedeman, Jr. |
| 2020/0157276 | A1 * | 5/2020 | Yoshimura ......... C08G 63/6886 |
| 2020/0207025 | A1 | 7/2020 | Priedeman |
| 2021/0087341 | A1 * | 3/2021 | Sawada .................. B29C 64/40 |

FOREIGN PATENT DOCUMENTS

| | | |
|---|---|---|
| CN | 104520484 A | 4/2015 |
| EP | 0 659 771 A1 | 6/1995 |
| EP | 0 728 767 A1 | 8/1996 |
| EP | 3689585 A1 | 8/2020 |
| GB | 717840 A | 11/1954 |
| GB | 1066188 A | 4/1967 |
| JP | 2008507619 A | 3/2008 |
| JP | 2013247177 A | 12/2013 |
| JP | 2014040085 A | 3/2014 |
| JP | 2017030346 A | 2/2017 |
| KR | 10-2014-0119785 A | 10/2014 |
| WO | 2006020279 A2 | 2/2006 |
| WO | 2006020279 A3 | 2/2006 |
| WO | 2010045147 A2 | 4/2010 |
| WO | 20120143182 A1 | 10/2012 |
| WO | 2014072147 A1 | 5/2014 |
| WO | 2015175682 A1 | 11/2015 |
| WO | 2016059986 A1 | 4/2016 |
| WO | 2016185874 A1 | 11/2016 |
| WO | 2016205690 A1 | 12/2016 |
| WO | WO-2016205690 A1 * | 12/2016 ........... B29C 64/106 |
| WO | 2017112687 A1 | 6/2017 |
| WO | 2017167691 A1 | 10/2017 |
| WO | 2020077127 A1 | 4/2020 |

OTHER PUBLICATIONS

Prosecution history from U.S. Appl. No. 16/643,275, filed Feb. 28, 2020 including: Notice of Allowance and Fee(s) Due dated Oct. 4, 2021, and Requirement for Restriction/Election dated Jul. 6, 2021.
International Search Report and Written Opinion of PCT/US2019/055694, filed Oct. 10, 2019, dated Mar. 6, 2020.
Restriction Requirement from corresponding U.S. Appl. No. 16/643,275 dated Jul. 6, 2021.
Communication pursuant to Rules 161(1) and 162 EPC from European Patent Application No. 19797448.8, dated May 19, 2021, 3 pages.
Communication pursuant to Article 64(3) EPC from corresponding European Patent Application No. 16738251.4, dated Nov. 27, 2020.
International Search Report and Written Opinion dated Oct. 4, 2016 for corresponding International Application No. PCT/US2016/038140, filed Jun. 17, 2016.
International Preliminary Report on Patentability dated Dec. 19, 2017 for corresponding International Application No. PCT/US2016/038140, filed Jun. 17, 2016.
International Search Report and Written Opinion of PCT/US2018/055277, dated Jan. 24, 2019.
Japanese Office Action dated Oct. 30, 2018 for corresponding Japanese Application No. 2017-564868, filed Dec. 14, 2017.

(56) References Cited

OTHER PUBLICATIONS

Canadian Office Action dated Nov. 14, 2018 for corresponding Canadian Application No. 2,989,059, filed Dec. 8, 2017.
Japanese Office Action dated Apr. 17, 2019 for corresponding Japanese Application No. 2017-564868, filed Dec. 14, 2017.
Korean Office Action dated Apr. 18, 2019 for corresponding Korean Application No. 10-2018-7001645, filed Jan. 18, 2018.
Canadian Office Action for CA 2,989,059, dated Jun. 17, 2019, 3 pages.
China Office Action, 201680035689.9, dated Nov. 5, 2019, 11 pages.
Communication pursuant to Article 94(3) EPC for European Application No. 16738251.4, dated Sep. 27, 2023.

* cited by examiner

WATER DISPERSIBLE SULFONATED THERMOPLASTIC COPOLYMER FOR USE IN ADDITIVE MANUFACTURING

CROSS-REFERENCE TO RELATED APPLICATION

This Application is a Section 371 National Stage Application of International Application No. PCT/US2019/055694, filed Oct. 10, 2019 and published as WO 2020/077127 A1 on Apr. 16, 2020, in English, which claims the benefit of U.S. Provisional Application Ser. No. 62/743,997 which was filed on Oct. 10, 2018; the contents of all of which are hereby incorporated by reference in their entirety.

BACKGROUND

The present disclosure relates to additive manufacturing systems for printing three-dimensional (3D) parts and support structures. In particular, the present disclosure relates to support and build materials for use in additive manufacturing systems, and methods of using the support and build materials as consumables in additive manufacturing systems to print items.

Additive manufacturing, also called 3D printing, is generally a process in which a three-dimensional (3D) part is built by adding material in layers, rather than subtracting material as is done in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of slices or layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

Additive manufacturing technologies can be used for prototyping (where it has been used for many years) and also for end-use production. For end-use part production, it is desirable to print net-shape parts, or near-net shape parts (i.e., parts that match very closely to the digital image provided as a source data file, and therefore require little or no post-print processing to achieve the desired tolerances for the size and shape for the part).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The solid portion of the filament essentially fills the diameter of the liquefier tube, and acts as a piston on the molten pool to provide sufficient pressure necessary to extrude the molten filament material further downstream in the liquefier. The molten material exits the nozzle tip to form a continuous flow or toolpath of resin material, in order to create layers and print a part. The extrusion rate is based on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and holds the desired part shape, and is removable from the completed printed part when the printing process is complete.

A multi-axis additive manufacturing system may be utilized to print 3D parts using fused deposition modeling techniques. The multi-axis system may include a robotic arm movable in three, four, five, six or more degrees of freedom. The multi-axis system may also include a build platform which may be movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing, as well as the routing for all toolpaths. In a multi-axis system, material may be deposited in conformable 3D tool paths laid incrementally upon each other in nonplanar layers to form a printed part resembling the digital representation.

Prior art methods of removing support structure have included breaking the support structure off of the part material (typically followed by smoothing out residual rough areas), or dissolving away soluble supports using an alkaline solution over the timeframe of many hours. It is desirable to have a support structure that can be quickly removed without special tools or chemical solutions, and with minimal labor. There is an on-going need for more easily removable support structures, to reduce the post-processing time and effort needed for printing of the part, and also to eliminate the process effluents used during a traditional chemical support removal bath.

SUMMARY

This disclosure relates to a filament material formed of a composition comprising a water-dispersible sulfonated thermoplastic copolymer produced from a reaction product of a sulfonate salt and an initial non-water-dispersible thermoplastic copolymer comprised of at least two different monomers forming a primary carbon chain. One of the at least two different monomers has pendant functional groups extending from the primary carbon chain and comprising acid groups or anhydride groups. The sulfonate salt is reacted onto the pendant functional groups by esterifying the acid groups of the initial non-water-dispersible thermoplastic copolymer with a hydroxyl-functionalized sulfonate salt, amidizing the acid groups of the initial non-water-dispersible thermoplastic copolymer with an amine sulfonate salt, or imidizing the anhydride groups of the initial non-water-dispersible thermoplastic copolymer with an amine sulfonate salt to produce sulfonated pendant groups. The water-dispersible sulfonated thermoplastic copolymer has a minimum amount of at least approximately 18 mol %, of the sulfonated molecule pendant groups, has a glass transition temperature of at least approximately 45 C, and is dispersible in tap water at ambient temperature without the aid of any other solubility or dispersibility adjuvant.

In another aspect of the above embodiment, a water-dispersible sulfonated thermoplastic copolymer will disperse in tap water having a pH of approximately 6.0 to 8.0 that is approximately 70 degrees C. or above in less than approximately 60 minutes.

In another aspect of the above embodiment, the initial non-water-dispersible thermoplastic copolymer is a blend of methacrylic acid and methyl methacrylate.

In another aspect of the above embodiment, the initial non-water-dispersible thermoplastic copolymer comprises a minimum of approximately 18 mole % of methacrylic acid.

In another aspect of the above embodiment, the water-dispersible sulfonated thermoplastic copolymer has a primary carbon chain and a pendant functional group extending from the primary carbon chain and where the esterification, amidization or the imidization is a reaction with the pendant functional group.

In another aspect of the above embodiment, the water-dispersible sulfonated thermoplastic copolymer will disperse in 70 C or above tap water in less than approximately 15 minutes.

In another aspect of the above embodiment, the amine sulfonate salt comprises sodium sulfanilate and the reaction is an amidization or imidization.

In another aspect of the above embodiment, the hydroxyl-functionalized sulfonate salt comprises 4-hydroxybenzenesulfonate, and wherein the reaction is an esterification.

In another aspect of the above embodiment, the water-dispersible sulfonated thermoplastic copolymer is substantially amorphous.

In another aspect of the above embodiment the water-dispersible sulfonated thermoplastic copolymer is at least semi-crystalline.

In another aspect of the above embodiment, the water-dispersible sulfonated thermoplastic copolymer has a charge density of at least about 0.4 meq./g.

In second embodiment, a method is disclosed of additive manufacturing a support structure for use with a part made of a non-water-dispersible copolymer. The method comprises providing a support structure comprising a water-dispersible sulfonated thermoplastic copolymer comprising a reaction product of a selected thermoplastic copolymer comprised of at least two different monomers forming a primary carbon chain. One of the at least two different monomers having pendant functional groups extending from the primary carbon chain and comprising an acid or an anhydride group, wherein the selected thermoplastic copolymer is reacted by either esterifying the acid of the selected thermoplastic copolymer with a hydroxyl-functionalized sulfonate salt, or amidizing the acid group of the selected thermoplastic copolymer with an amine sulfonate salt, or imidizing the anhydride group of the selected thermoplastic copolymer with an amine sulfonate salt. The esterification, the amidization or the imidization results in the water-dispersible sulfonated thermoplastic copolymer having a glass transition temperature suitable to provide an effective support for the part and wherein the water-dispersible sulfonated thermoplastic copolymer has a minimum amount of at least approximately 18 mol %, of the sulfonated molecule pendant groups, and has a glass transition temperature of at least approximately 45 C. The non water-dispersible copolymer is separated from the water-dispersible sulfonated thermoplastic copolymer by subjecting the water-dispersible sulfonated thermoplastic copolymer to ambient temperature water without the aid of any other solubility or dispersibility adjuvant.

In another aspect of the second embodiment, the water comprises a pH of approximately 6.0 to 8.0.

In another aspect of the second embodiment, the selected thermoplastic copolymer is the reaction product of a blend of methacrylic acid and methyl methacrylate.

In another aspect of the second embodiment, the selected thermoplastic copolymer has a primary carbon chain and a pendant functional group extending from the primary carbon chain and wherein the esterification, or amidization is a reaction with the pendant functional group.

In another aspect of the second embodiment, the water-dispersible thermoplastic copolymer will disperse in water in less than approximately 1 hour.

In another aspect of the second embodiment, the water-dispersible thermoplastic copolymer will disperse in water that is approximately 70 degrees C. or higher within 1 hour.

In another aspect of the second embodiment, the hydroxyl-functionalized sulfonate salt comprises 4-hydroxybenzenesulfonate, and wherein the amine sulfonate salt comprises sodium sulfanilate.

In another aspect of the second embodiment, the water-dispersible thermoplastic copolymer is substantially amorphous.

In another aspect of the second embodiment, the water-dispersible thermoplastic copolymer is at least semi-crystalline.

In another aspect of the second embodiment, the water-dispersible thermoplastic copolymer has a charge density of at least about 0.4 meq./g, suitable to exhibit water solubility or water-dispersibility.

In another aspect of the second embodiment, the water-dispersible sulfonated copolymer comprises a toner powder material having a particle size distribution ranging from about 5 micrometers to about 50 micrometers, and including a charge control agent, and thereby suitable for use as a consumable material in an electrophotography-based additive manufacturing system.

In another aspect of the second embodiment, the water-dispersible sulfonated copolymer comprises a toner powder material having a particle size distribution ranging from about 5 micrometers to about 50 micrometers, and including a charge control agent, and thereby suitable for use as a consumable material in an electrophotography-based additive manufacturing system.

Definitions

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The term "addition polymer"'" refers to a polymer that is formed from monomers by addition polymerization, an addition reaction where monomers bond together via rearrangement of bonds without the loss of any atom or molecule under specific conditions of heat, pressure, and/or the presence of a catalyst. Sometimes this type of polymerization is also referred to as "chain growth" polymerization, free radical polymerization, and such polymer chains may be self-initiated through heat or require the use of a catalyst. Additive polymerization is in contrast to a condensation polymerization wherein the polymer is formed by a condensation reaction where a molecule, usually water, is lost during the formation.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers to one or more molecules of the chemical compound, rather than being limited to a single molecule of the chemical compound. Furthermore, the one or more molecules may or may not be identical, so long as they fall under the category of the chemical compound. Thus, for example, "a" polystyrene is interpreted to include one or more polymer molecules of the polystyrene, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polystyrene", "one or more polystyrenes", and "polystyrene(s)" may be used interchangeably and have the same meaning.

The terms "about", approximately and "substantially" are used herein with respect to measurable values and ranges due to expected variations known to those skilled in the art (e.g., limitations and variability in measurements).

The term "providing", such as when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the water-dispersible material can break apart into smaller pieces and/or particles of polymer in the solution or dispersion. Some or all of the water-dispersible material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9 or in some cases between about 6 and 8. Although these pH's are slightly basic or slightly acidic, the defining feature of the water soluble materials is that they do not require an acidic or basic solution to disintegrate and can disintegrate in water at about neutral pH, e.g. tap water.

"High temperature build environment" as referred to herein relates to build environments of about 45° C. or greater in additive manufacturing systems.

"Heat deflection temperature" or "heat distortion temperature" (HDT) is the temperature at which a polymer sample deforms under a specified load and is determined by the test procedure outlined in ASTM D648.

"Thermally stable" as referred to herein relates to the material having a heat deflection temperature sometimes referred to as heat distortion temperature (HDT) compatible with the desired build environment such that they do not exceed their thermal-degradation kinetics thresholds.

The term "sulfonated copolymer" referred to herein is a reaction product of a copolymer with a sulfonate salt.

All percentages in this disclosure are on a mole basis unless otherwise specified.

DETAILED DESCRIPTION

Figure 1:
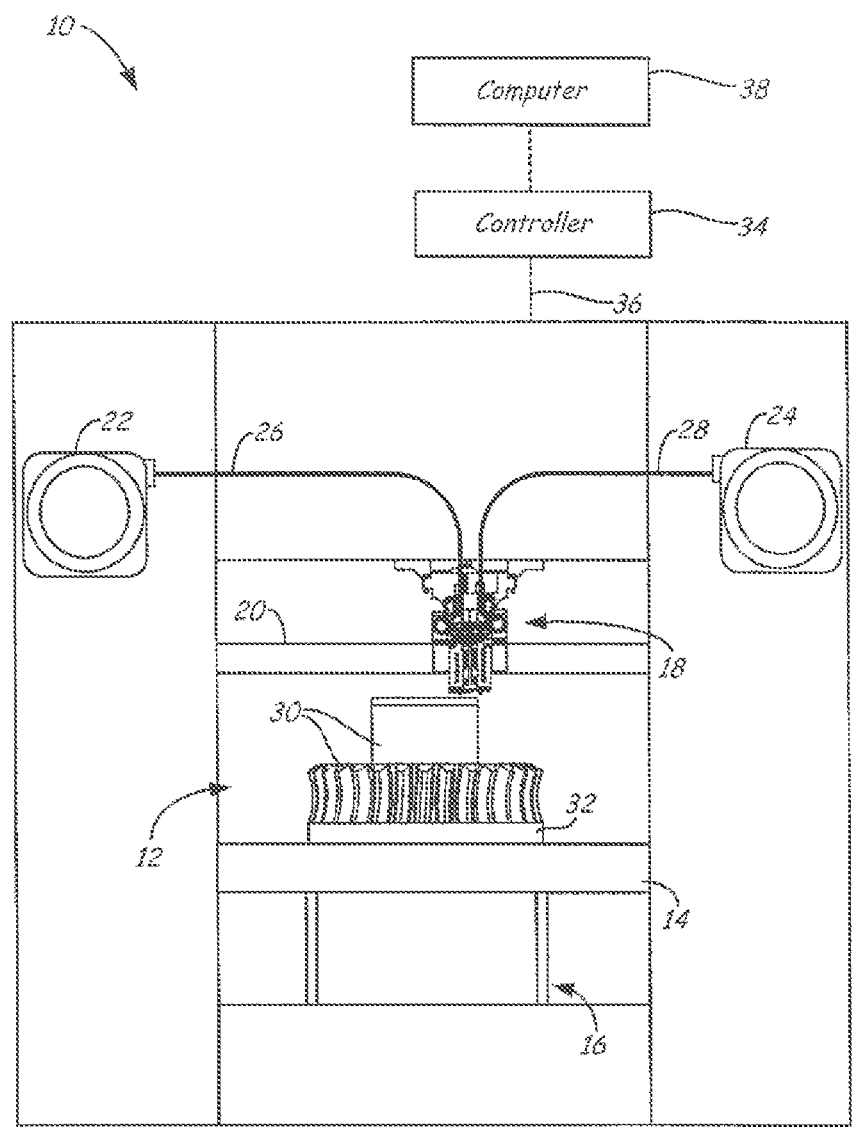
FIG. 1 is a front view of an extrusion-based additive manufacturing system configured to print printed parts and support structures, where the support structures are printed from a water-dispersible material of the present disclosure.

The present disclosure is directed to a water-dispersible sulfonated thermoplastic copolymer material for use as a consumable feedstock in 3D printing. The sulfonated copolymer material is made from a precursor non-water soluble thermoplastic copolymer having a pendant reactive functional group extending from the primary carbon chain or "backbone" of the copolymer. The sulfonated thermoplastic copolymer material can be used for printing sacrificial support structures for 3D parts built in a range of build temperature environments of additive manufacturing systems. It can also be used for layer-wise printing of dissolvable 3D parts.

The sulfonated thermoplastic copolymer material is formulated to have good adhesion to the part material, provide sufficient support during the manufacturing process (appropriate glass transition temperature for use with a part material), and to exhibit thermal stability for and during the manufacturing process. Further, any shrinkage of the support material should be matched to that of the modeling material, as shrink differential in the materials would cause stresses and bond failures along the model/support structure joint. For use in fused deposition modeling, the material must exhibit properties appropriate for melt extrusion through a liquefier nozzle, typically measured by melt viscosity, or its inverse property, melt flow. When configured as a filament feedstock for fused deposition modeling, the sulfonated copolymer material must also exhibit flexibility. Criteria for pairing support materials with model material in fused deposition modeling are taught for example in Priedeman U.S. Pat. No. 6,645,412.

The precursor unsulfonated, non-water soluble copolymer used in the present invention may be a commercially available copolymer, or, a copolymer blend may be customized for desired material properties and molecular weight through proper selection and amount of the at least two monomers (one sulfonated, and one primarily non-sulfonated) to affect such properties prior to the reaction of the sulfur group on the polymer chain backbone. The appropriate copolymer blend will perform with an appropriate melting point and viscosity range to use in a heated liquefier. The thermal properties of the copolymer can be tailored to the process in which it will be used, e.g., pairing the water-dispersible sulfonated thermoplastic copolymer with a material used for printing the 3D parts, by selecting a desired molecular weight and formulation for the reaction product.

The melt flow characteristics of thermoplastic used in fused deposition modeling have specific constraints in order to deposit and build an accurately shaped part using a heated liquefier. If the melt flow characteristic is not appropriate, the molten resin could either drip out of the unrestricted liquefier nozzle, or plug it. A material used to build models in a Stratasys FDM™ 3D printer having a filament-pump extruder must have a high melt flow at the extrusion temperature, so as to be extruded as a continuous bead under a relatively low pressure of, for example, 3000 psi or less. The molecular weight of a polymer will significantly impact the resulting melt flow and viscosity in a liquefier. A desirable high melt flow for material deposited by a filament-pump type extruder is greater than 1 gms/10 minutes, as measured by ASTM D1238, under a load of 1.2 kg at the extrusion temperature. More preferably, the melt flow is between 5-30 g/10 minutes, although a lower melt flow (higher viscosity) is suitable for extrusion at higher pressures which may be achieved, for example, using a screw pump liquefier. In fused deposition modeling, three examples of an appropriate melt flow characteristic we those of commonly available part materials such as ULTEM™, PC and ABS modeling filaments made by Stratasys. Melt flow rates (g/10 min) for ULTEM™ 9085(Tg~185 C), PC (Tg~150 C), and ABS (Tg~105 C) modeling filaments, respectively, are:

8.9 g/10 min, at 295 C w/6.6 kgf load
25 g/10 min, at 300 C w/1.2 kgf load
12 g/10 min, at 230 C w/3.8 kgf load Melt viscosity is related not only to polymer composition, molecular weight, but also to temperature, shear rate, etc.

In general, the inventive sulfonated support copolymer, and the precursor copolymer, must have good adhesion to the part material (through selection of similar chemical make-up), flexibility/lack of brittleness to allow for fabrication into thin extruded filament material when used in fused deposition modeling systems, have sufficient flexibility to be fed through from a source of material to the print head of the fused deposition modeling system, provide sufficient support during the additive manufacturing process (through appropriate selection of materials with reasonably similar glass transition temperatures as a part material), and exhibit thermal stability for and during the manufacturing process. This is done through proper selection of the addition copolymer types and polymer backbone length. The dispersibility of the resulting support material in tap water is influenced by the extent of reaction of sulfur-based pendant groups on the copolymer chain.

This disclosure envisions three methods of reaction (esterification, amidization, or imidization) with the pendant reactive functional group of a selected monomer type in a precursor copolymer molecule, to make the sulfonated thermoplastic copolymer water-dispersible as defined herein.

It is understood that, although sodium is described and used throughout this application as an ion of choice as an alkali metal sulfonate salt, other monovalent and multivalent ions may be selected for similar functionality. For example, lithium or ammonium sulfonate salts would perform comparably.

Esterification includes reacting a hydroxyl-functionalized sulfonate salt with a pendant functional group extending from the primary chain of the thermoplastic copolymer. One such example is set forth below in which a copolymer chain having a carboxylic acid side group pendant from a carbon in the primary chain of the copolymer is reacted with sodium phenol sulfonate as shown below:

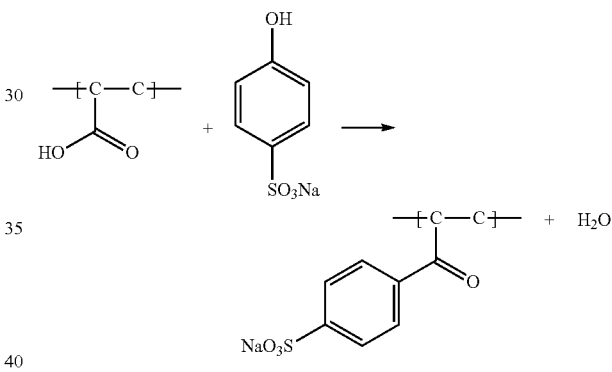

The sodium phenol sulfonate would be reacted with the carboxylic acid side group-containing monomer units in the copolymer chain. Approximately 18 to 40 mol percent of the monomer units of the thermoplastic copolymer would be carboxylic acid containing, and their reaction with sodium phenol sulfonate would produce a high glass transition temperature (Tg) support material that exhibits good thermal stability and good adhesion to polyesters and acceptable water-dispersibility as defined herein. A more preferred range of approximately 25 to 35 mol % of monomer units would be carboxylic acid containing, and reacted with sodium phenol sulfonate to produce a high Tg support material exhibiting good thermal stability and good adhesion and being water-dispersible as defined here in. The remaining mol % of monomer units of the thermoplastic copolymer would be chosen to provide good support material properties such as adhesion to part materials, appropriate Tg to match a part material, filament flexibility, melt viscosity, etc. Some of the monomer units having carboxylic acid containing pendant groups may be left unsulfonated to achieve desired overall properties.

Amidization includes reacting a primary amine such as an amine sulfonate salt (e.g. sodium sulfanilate) pendant from the primary chain of at least one of the monomers in the thermoplastic copolymer to make the copolymer water-dispersible. One such example is set forth below which includes reacting sodium sulfanilate with a carboxylic acid group pendant from the primary chain of the copolymer. Some or all of the monomer units containing carboxylic acid containing pendant groups may be left unsulfonated to achieve desired overall properties.

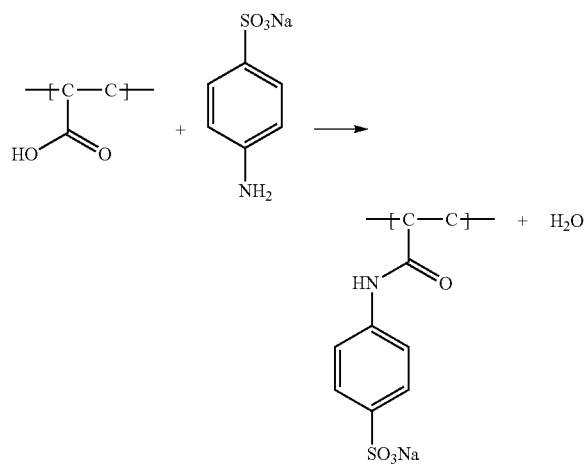

The resulting sulfonated water-dispersible copolymer exhibits a high Tg, thermal stability with excellent adhesion to a polyamide part material and being water-dispersible as defined here in. The remain mol % of monomer units of the thermoplastic copolymer would be chosen to provide good support material properties such as adhesion to part materials, Tg, flexibility, melt viscosity, etc.

Imidization includes reacting an amine sulfonate salt with an anhydride functional group pendant from the primary chain of the thermoplastic copolymer to make the copolymer a water-dispersible copolymer. One such example is set forth below which includes reacting sodium sulfanilate with a polymaleic anhydride copolymer.

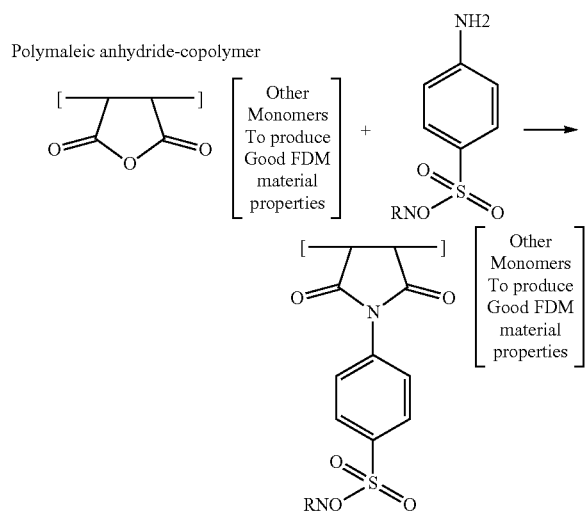

The resulting maleimide copolymer exhibits a high Tg, thermal stability with excellent adhesion to a polyimide part material and being water-dispersible as defined here in. The remain mol % of monomer units of the thermoplastic copolymer would be chosen to provide good support material properties such as adhesion to part materials, Tg, flex-ibility, melt viscosity, etc. As is the case with the previous reaction types, some or all of the monomer units containing carboxylic acid containing pendant groups may be left unsulfonated to achieve desired overall properties.

In all three cases, esterification, amidization and imidization, the resulting sulfonated copolymer support material has to have a glass transition temperature (Tg) sufficiently high to provide sufficient support to the part material as the part is being built, without thermal degradation. If the Tg is not sufficiently high enough the part material will not be adequately supported during the heat intensive manufacturing process.

The water-dispersible sulfonated copolymer of the present disclosure functions as a sacrificial material for an associated part material in additive manufacturing (aka 3D printing) applications. A sacrificial support material can be desirable where overhanging features are required, where significant angular slopes exist in the printed items and where it is essential to also preserve delicate features in the printed item, such as small orifices or controlled pore structures, and in some situations, to laterally encase the printed item. Once the item has been printed, the support structure of the water-dispersible material is removed to reveal the completed printed item without damaging any of the critical or delicate geometrical features of the printed item. To accomplish this removal, the disclosed material is water-dispersible, allowing the support structure to be at least partially and typically completely dissolved away from the printed item. The support structure may be made solely of the water-dispersible copolymer of this disclosure or other non-dispersible copolymers may be incorporated therein as long as the water-dispersibility is not substantially affected. In addition, mixtures of other sulfonated copolymers, water-soluble polymers or copolymers, and non-soluble polymers or copolymers; additives, fillers, and/or stabilizers may be added to the water-dispersible copolymer of this disclosure.

The present disclosure also includes the use of the water-dispersible sulfonated copolymer for manufacturing a dissolvable part suitable for downstream uses such as sacrificial tooling. A sacrificial tool encompassing the water-dispersible copolymer may be a dissolvable core type structure on which a part or device is subsequently produced or providing some type of platform for subsequent manufacture of a part or device. Such a process is distinguished from for example a direct additive manufacturing process wherein both the part and the support structure are concurrently printed. For example, a device made of thermoplastic composite material may be formed around the sacrificial tooling made of the water-dispersible copolymer. Once the carbon fiber device is made, the water-dispersible thermoplastic copolymer is disintegrated by introducing the water-dispersible thermoplastic copolymer to water.

The water used to disperse the water-dispersible sulfonated copolymer of the present disclosure is plain tap or naturally occurring water. Removing a support structure from a 3D part or dissolving a sacrificial tool does not require the presence of a basic or acidic environment or heating of the aqueous solution. In addition, the solubility of the water-dispersible material is sufficient for use of removal of supports in an automated process or hands-free manner. Plain tap water typically has an average pH of approximately 7. However, water pH varies greatly, ranging anywhere from having a pH between approximately 5.0 and 9.0 is also suitable. In any event, the pH of the water does not need to be adjusted to disintegrate the water-dispersible thermoplastic polymer. After it disintegrates, the dispersed water soluble copolymer solution may be processed by increasing the ionic strength of the solution to precipitate out the water-dispersible thermoplastic copolymer.

In the embodiment of additive manufacturing, in order to effectively print a support structure in coordination with a printed item, for example in a fused deposition modeling process, amorphous support materials preferably have a Tg that is approximately equivalent to or higher than the Tg of the part material. For example, a Tg of ±20 C with a more preferred range of ±15 C of the support material with respect to the Tg of the part material would be considered approximately equivalent. The size of the copolymer (molecular weight) and amount of the sulfonated molecule will have an effect on the Tg of the thermoplastic polymer. That is, more additions of monomer units, as well as sulfonated molecules, will increase the molecular weight and increase the Tg and heat deflection temperature of the material. This allows the matching of thermal properties of the support material to a part material, so that the consumable materials printed together as a material pair will have similar heat deflection temperatures, degradation temperatures, and other thermal characteristics. For example, similar glass transition and heat deflection temperatures allow the part and support materials to be printed together in the same heated environment while preventing excessive distortions and curling, as well as part:support distortion mismatches. Table 1 shows some common part materials used in additive manufacturing and their glass transition temperatures. In accordance with the present invention, for a given part material, a customized molecular weight, tap-water soluble sulfonated thermoplastic copolymer support material can be produced by sulfonating the side groups of a copolymer, specifically an addition polymer, with an alkali metal sulfonate salts, to thereby perform with similar melt characteristics of the part material.

TABLE 1

| Part Material | Glass Transition Temperature, Tg |
| --- | --- |
| Acrylonitrile Butadiene Styrene | 123 C. |
| Polycarbonate | 155 C. |
| Ultem ® 9085* | 185 C. |
| Ultem ® 1010* | 217 C. |

*ULTEM ™ is a registered trademark of SABIC or its affiliates

The material selection choice for the support material:part material match is done partially with a focus on Tg, but is also done with respect to chemical makeup of the part material. A support material must adhere at least minimally to part material to function properly as a support structure. Without adherence, parts will not be made properly because they will repel away from a nearby support, and will result in a deformed part build. By careful selection of the support chemistry through the selection of a first sulfonated monomer (monomer A) in the copolymer, the support material:part material match is done through selecting 'like' monomers, and adhesion will occur appropriately. The sulfonated monomer portions of the resulting copolymer are easily affected by water later on in the support removal process, causing support material dispersibility in a very short timeframe, compared to traditional alkaline support material removal times.

The selection of the second monomer (monomer B) in the thermoplastic copolymer is done to further customize or tailor the filament material properties for robust handling and performance throughout the printing process.

For semi-crystalline or crystalline support materials, heat deflection temperature is more indicative of acceptable performance than Tg of the amorphous portion of semi-crystalline part and support materials. An example of suitably equivalent support material heat deflection temperature is ±20° C. of the part heat deflection temperature, with a more preferred range of ±15° C.

The water-dispersible sulfonated copolymer material of the present disclosure may be configured for use with several different additive manufacturing techniques, such as extrusion-based additive manufacturing systems, high-speed sintering systems, selective laser sintering systems, electrophotography-based additive manufacturing systems, and the like. The water-dispersible sulfonated copolymer material may be configured in whatever filament feedstock geometries or format is required for use as a consumable material in a given fused deposition modeling additive manufacturing system, including round filament, ribbon filament, powder, pellet, or slug formats.

Depending on the additive manufacturing technique selected, it may be desired to customize the level of crystallinity of the copolymeric material. For example, in sintering applications, crystallinity is desired. In fused deposition modeling systems applications, it is typically more desirable to use amorphous or semi-crystalline copolymeric materials.

As shown in FIG. 1, system 10 is an example of an extrusion-based additive manufacturing system for printing or otherwise building 3D parts and support structures using a layer-based, additive manufacturing technique, where the support structures may be printed from the water-dispersible sulfonated copolymer material of the present disclosure. Suitable extrusion-based additive manufacturing systems for system 10 include fused deposition modeling systems developed by Stratasys, Inc., Eden Prairie, MN under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner. Example techniques for locally heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or other substrate on which the printed parts and support structures are printed. In the shown example, print head 18 is a dual-tip extrusion head configured to receive consumable filaments from consumable assemblies 22 and 24 (e.g., via guide tubes 26 and 28) for printing printed 3D part 30 and support structure 32 on platen 14. Consumable assembly 22 may contain a supply of a part material, such as a high-performance part material, for printing printed 3D part 30 from the part material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
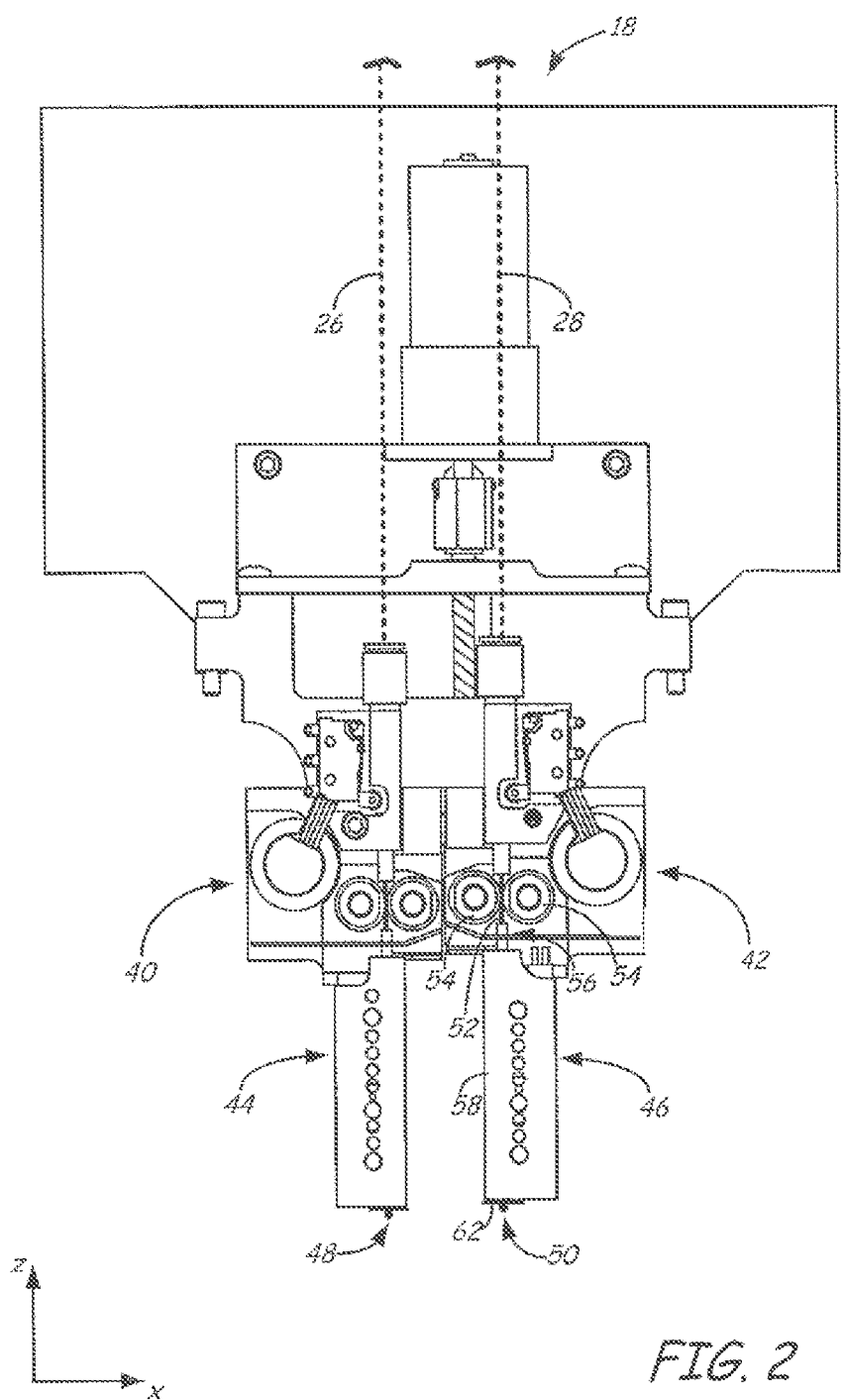
FIG. 2 is a front view of a print head of the extrusion-based additive manufacturing system.

The print head 18 can have any suitable configuration. FIG. 2 illustrates a suitable dual-tip device for print head 18, as described in Leavitt, U.S. Pat. No. 7,625,200. Other examples of suitable devices for print head 18 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms (shown in FIG. 3) are directed to intermittently feed the modeling and support materials (e.g., consumable filaments via guide tube assemblies 26 and 28) through print head 18 from supply sources 22 and 24.

Figure 3:
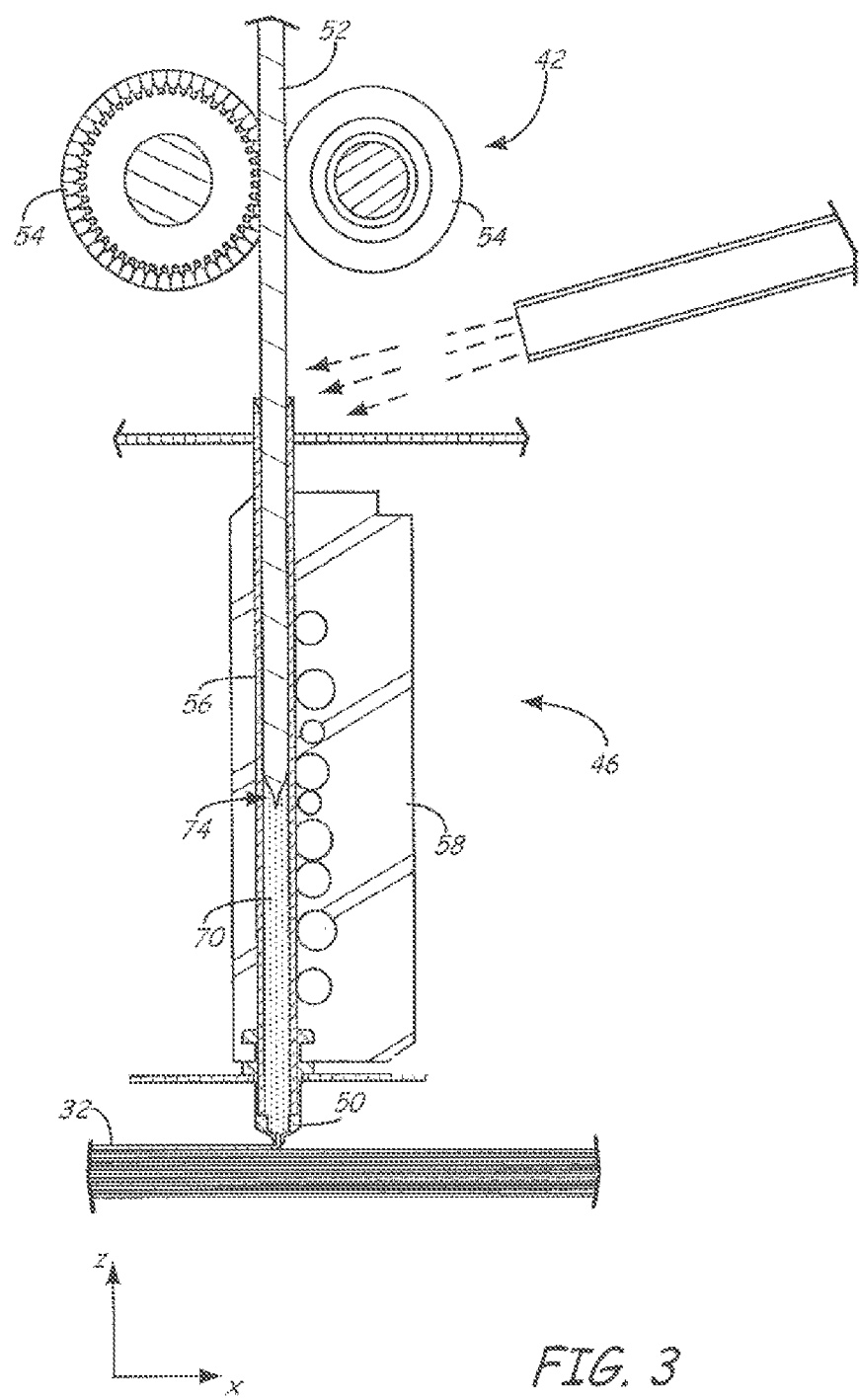
FIG. 3 is an expanded sectional view of a drive mechanism, a liquefier assembly, and a nozzle of the print head for use in the extrusion-based additive manufacturing system.

In the shown embodiment of FIG. 2, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52. During operation, controller 34 may direct wheels 54 of drive mechanism 42 to selectively draw successive segments filament 52 (of the support material) from consumable assembly 24 (via guide tube 28), and feed filament 52 to liquefier assembly 46. In alternative embodiments, the consumable material may be provided in other geometries or formats adapted for other types of print heads and feed systems, such as powder, liquid, pellet, slug, or ribbon forms.

Liquefier assembly 46 is heated to melt the provided consumable material to form melt 70. Preferred liquefier temperatures will vary depending on the particular copolymer composition of the consumable material, and are preferably above the melt processing temperature of the material. The molten portion of the material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads, to thereby print support structure 32 in a layer-by-layer manner in coordination with the printing of printed 3D part 30. After the print operation is complete, the resulting printed 3D part 30 and support structure 32 may be removed from chamber 12. Support structure 32 may then be sacrificially removed from printed 3D part 30, such as by dissolution in tap water.

The compositions of the present invention may also be provided in powder form for use in additive manufacturing systems that use powder-based consumables, e.g., electrophotography-based additive manufacturing systems and selective laser sintering systems. Electrophotography-based additive manufacturing systems are disclosed, for example, in Hanson et al., U.S. Pat. Nos. 8,879,957 and 9,423,756, and Comb et al., U.S. Publication Nos. 2013/0186549 and 2013/0186558. Such EP-based systems utilize charged particle materials, referred to as toner powder materials, for printing 3D parts and support structures. Toner powder materials for use in EP-based AM systems have a particle size distribution ranging from about 5 micrometers to about 50 micrometers, and include a charge control agent. The addition of a charge control agent to copolymer powders for EP-based systems is disclosed in Orrock et al., U.S. Pat. No. 9,523,934, the disclosure of which is incorporated by reference to the extent that it does not conflict with the present disclosure.

In an exemplary electrophotography based additive manufacturing system, each layer or partial thickness layer may be developed using electrophotography and carried from an electrophotography (EP) engine by a transfer medium (e.g., a rotatable belt or drum). The layer or partial thickness layer includes part material, and optionally support material. The partial thickness layer is then transferred to a build platform to print the 3D part (or support structure) in a layer-by-layer manner, where the successive partial thickness layers are transfused together. Printing with partial thickness layers increases the resolution of the 3D part in the z direction relative to 3D parts printed with layers having the thickness of the nominal thickness of the slice.

As discussed above, the water-dispersible material of the present disclosure compositionally comprises a sulfonated copolymer and in particular, an at least partially sulfonated copolymer. Sulfonated thermoplastic copolymers are more easily dispersed in water and/or form smaller aggregates in dispersion if the sulfonated thermoplastic copolymer has a high charge density. Charge density is usually expressed in milliequivalents (meq) of ionic groups per gram of copolymer. Suitable charge densities of this disclosure are in the approximate range of about 0.4 to about 0.9 meq/g. Suitable charge densities are also those that for any particular sulfonated copolymer provide a water-dispersibility characteristic to that sulfonated copolymer. Sulfonated polymers with high charge densities are more easily and quickly dispersed in water, lending themselves to faster manufacturing removal. Lower charge densities produce copolymers that are more resistant to water-dispersibility.

The choice of cation on the alkali metal sulfonate salt selection will influence the charge density of the copolymer, and thus the water-dispersibility of the resulting copolymer. Monovalent alkali metal ions (cations) yield copolymers which are less readily dissipated by cold water and more readily dissipated by hot water, while divalent and trivalent metal ions result in polymers that are not ordinarily easily dissipated by cold water but are more readily dispersed in hot water. It is possible to prepare the sulfonated copolymer using, for example, a sodium sulfonate salt and later by ion-exchange replace this ion with a different ion, for example, calcium or lithium, and thus alter the characteristics of the copolymer. In general, this procedure is superior to reacting the copolymer with divalent salts inasmuch as the sodium salts are usually more water soluble.

One or both of the at least two monomers in the selected copolymer contain functional pendant groups which can be sulfonated to create a water dispersible support material. It is contemplated that the resulting copolymer may have 100% of the functional pendant groups sulfonated, or some lower combination of sulfonated and unsulfonated monomer pendant groups in the copolymer chain. The minimum amount of sulfonated monomers in the yet-unreacted copolymer molecule may depend on the functional group itself, and where the minimum amount of sulfonated molecule pendant groups to be reacted is dictated by its water-dispersibility. It is believed that approximately 18% is a minimum and up to approximately 40% of the monomer groups of the copolymer are sulfonated, or approximately 20 to 35% are sulfonated, or approximately 25 to 35% are sulfonated to provides suitable water-dispersibility. The remainder of the copolymer monomer choice is made in order to provide thermal stability to the sulfonated thermoplastic copolymer for and during the additive manufacturing heating process, as well as to provide other appropriate material characteristics to the consumable feedstock, such as melt viscosity and flexibility to filament materials. Currently available caustic soluble filaments in the marketplace tend to be brittle in nature, and break easily, preventing them from being adequately fed as filament into a 3D printer.

One particular monomer in the copolymer of interest is poly(styrene-co-maleic anhydride) (SMA), or SMA with additional co-monomers, which can undergo a number of reactions to form pendant groups which impart water-dispersibility to the copolymer. The reactions with SMA (styrene maleic anhydride) include:

1. Esterification with hydroxyl-functionalized sulfonate salt, e.g., 4-hydroxybenzenesulfonate
2. Amidization with amine sulfonate salt, e.g., sodium sulfanilate
3. Imidization (anhydrides) with amine sulfonate salt, e.g., sodium sulfanilate It is believed that approximately 18 to 40 mol % of the copolymer is composed of a sulfonated monomer, or approximately 20 to 35 mol % sulfonated monomer, or approximately 25 to 35 mol % sulfonated monomer, to provide suitable water-dispersibility. It is understood that the amount of monomer containing sulfonatable functional pendant groups in the overall copolymer may have only a portion of them ultimately sulfonated for water dispersibility performance. For instance with imidization, the resultant imide content of the water-dispersible copolymer will increase thermal stability and Tg; and enhance lamination strength to imide and sulfone build materials. The adherence of this copolymer to polyetherimide (PEI), and polysulfones has been found to be better than to copolymers not containing imide or anhydride groups.

A preferred copolymer for sulfonization by imidization comprises a styrene, maleic anhydride copolymer (SMA) (1:1 to 5:1), reacting the maleic anhydride with a primary amine such as sodium sulfanilate, which results in a pendant maleimide, sodium-phenyl sulfonate. The maleimide group is very stable and suitable for additive manufacturing and has good adhesion to polyetherimide and polysulfones part materials used in additive manufacturing processing. Imide functional groups improve the overall molecule Tg and provide for good part adhesion, thermal stability and water-dispersibility. It has good properties as a support material for a PEI blend part material such as ULTEM™ 9085 filament sold by Stratasys, Inc. of Eden Prairie, Minnesota. The Tg pairing was in the approximate range of 170 to 220 C. The resulting pendant group-reacted water-dispersible thermoplastic copolymer dispersed in water in 15 minutes being circulated with a stirrer at about 300 rpm in 70 degree C. water.

A preferred copolymer for sulfonization (both esterification and amidization) comprises a blend of methacrylic acid and methyl methacrylate preferably having a minimum of 18 mol % of methacrylic acid monomer units sulfonated within the base copolymer. It is understood that the amount of monomer containing sulfonatable functional pendant groups in the overall copolymer may have only a portion of them ultimately sulfonated for water dispersibility performance. The methacrylic acid pendant groups on the copolymer chain are reacted with the hydroxy functionalized sulfonate salt or an amine functionalized sulfonate salt. One such available copolymer is Eudragit with about 33 mol % to 50 mol % methacrylic acid sold by Evonik Industries AG of Germany.

As further examples, the table below shows through examples the relationship of the 3 methods of sulfonization mechanisms discussed herein with example part materials of interest and respective needed glass transition temperature range.

| Part Material Chemistries | Part Material Examples | Reaction route for Support Material | ~Typical Tg Part Material Range, C. |
|---|---|---|---|
| Polyesters | PETG, Amphora ™ (Eastman), Tritan ™ (Eastman) | esterification | 70-160 C. |
| Polyamides | Grivory G ™ (EMS-Grivory), Grilamid TR ™ (EMS-Grivory), Rilsan Clear ™ (Arkema) | amidization | 125-220 |
| Polyimides | ULTEM ™ 9085* (Stratasys), ULTEM ™ 1010* (Stratasys), Ultrason ™ (BASF), Polysulfones | imidization | 170-225 |

*ULTEM ™ is a registered trademark of SABIC or its affiliates

In this example, most or all of the functional pendant groups of maleic anhydride monomer are sulfonated; an exemplary concentration of maleic anhydride monomer in the copolymer molecule is approximately 20-50 mol %, and the styrene at approximately 50-80% mol %, A typical molecular weight of this copolymer is approximately 100-200,000. Other additional copolymers can be used to increase Tg to extend utility to high temperature build materials such as polycarbonate; polysulfones, polyetherimides, and the like. Depending on co-monomers selected, the concentration of pendant groups sulfonated can be selected from 5-50 mol %, preferably 15-35 mol %. A typical molecular weight (MW) target useful for appropriate viscosity and melt flow would be 50,000-200,000 Daltons.

Examples of suitable comonomers for use in the other portion of the copolymer molecule, to further manipulate subsequent filament properties include styrenes such as styrene, chlorostyrene, dichlorostyrene, bromostyrene, dibromostyrene, fluorostyrene, trifluorostyrene, nitrostyrene, cyanostyrene, α-methylstyrene, p-chloromethylstyrene, p-cyanostyrene, p-amino styrene, p-acetoxystyrene, p-styrenesulfonyl chloride, ethyl p-styrenesulfonyl, methyl p-styrenesulfonyl, propyl p-styrenesulfonyl, p-butoxystyrene, p-hydroxystyrene, 4-vinylbenzoic acid, 3-isopropenyl-α,α'-dimethylbenzyl isocyanate and vinylbenzyltrimethylammonium chloride.

Vinyl ethers may also be comonomers and examples of suitable vinyl ethers include isobutyl vinyl ether, ethyl vinyl ether, 2-phenyl vinyl alkyl ether, nitrophenyl vinyl ether, cyanophenyl vinyl ether, chlorophenyl vinyl ether and chloroethyl vinyl ether.

Suitable acrylic acid esters may also be comonomers and some examples include methyl acrylate, ethyl acrylate, propyl acrylate, butyl acrylate, pentyl acrylate, hexyl acrylate, decyl acrylate, lauryl acrylate, octyl acrylate, dodecyl acrylate, stearylacrylate, 2-ethylhexylacrylate, cyclohexyl acrylate, bornyl acrylate, 2-ethoxyethyl acrylate, 2-butoxyethyl acrylate, 2-hydroxyethyl acrylate, tetrahydrofurfuryl acrylate, methoxyethylene glycol acrylate, ethylcarbitol acrylate, 2-hydroxypropyl acrylate, 4-hydroxybutyl acrylate, 3-(trimethoxysilyl)propyl acrylate, polyethylene glycol acrylate, glycidyl acrylate, 2-(acryloyloxy)ethyl phosphate, 2,2,3,3-tetrafluoropropyl acrylate, 2,2,2-trifluoroethyl acrylate, 2,2,3,3,3-pentafluoropropyl acrylate and 2,2,3,4,4,4-hexafluorobutyl acrylate, Examples of methacrylic acid esters suitable as comonomers include methyl methacrylate, t-butyl methacrylate, sec-butyl methacrylate, i-butyl methacrylate, i-propyl methacrylate, decyl methacrylate, lauryl methacrylate, octyl methacrylate, dodecyl methacrylate, stearyl methacrylate, cyclohexyl methacrylate, bornyl methacrylate, benzyl methacrylate, phenyl methacrylate, glycidyl methacrylate, polyethylene glycol methacrylate, 2-hydroxyethyl methacrylate, tetrahydrofurfuryl methacrylate, methoxyethylene glycol methacrylate, ethylcarbitol methacrylate, 2-hydroxypropyl methacrylate, 4-hydroxybutyl methacrylate, 2-(methacryloyloxy)ethyl phosphate, 2-(dimethylamino)ethyl methacrylate, 2-(diethylamino)ethyl methacrylate, 3-(dimethylamino)propyl methacrylate, 2-(isocyanato)ethyl methacrylate, 2,4,6-tribromophenyl methacrylate, 2,2,3,3-tetrafluoropropyl methacrylate, 2,2,2-trifluoroethyl methacrylate, 2,2,3,3,3-pentafluoropropyl methacrylate, 2,2,3,4,4,4-hexafluorobutyl methacrylate and diacetone methacrylate, Maleimides are also suitable as comonomers and suitable examples include N-phenylmaleimide, N-(chlorophenyl) maeimide, N-(methylphenyl)maleimide, N-(isopropylphenyl)maleimide, N-(sulfophenyl)maleimide, N-methylphenylmaleimide, N-bromophenylmaleimide, N-naphthylmaleimide, N-hydroxyphenylmaleimide, N-methoxyphenylmaleimide, N-carboxyphenylmaleimide, N-(nitrophenyl)maleimide, N-benzylmaleimide, N-(4-acetoxy-1-naphthyl)maleimide, N-(4-oxy-1-naphthyl)maleimide. N-(3-fluoranthyl)maleimide, N-(5-fluoresceinyl)maleimide, N-(1-pyrenyl)maleimide, N-(2,3-xylyl)maleimide, N-(2,4-xylyl)maleimide, N-(2,6-xylyl)maleimide, N-(aminophenyl)maleimide, N-(tribromophenyl)maleimide, N-[4-(2-benzimidazolyl)phenyl]maleimide, N-(3,5-dinitrophenyl)maleimide, N-(9-acridinyl)maleimide, maleimide, N-(sulfo-phenyl)maleimide. N-cyclohexylmaleimide. N-methylmaleimide, N-ethylmaleimide and N-methoxyphenylmaleimide, Suitable examples of fumaric acid diesters as comonomers include dibutyl fumarate, dipropyl fumarate, diethyl fumarate and dicyclohexyl fumarate, fumaric acid monoesters such as butyl fumarate, propyl fumarate and ethyl fumarate.

Maleic acid diesters such as dibutyl maleate, dipropyl maleate and diethyl maleate, and maleic acid monoesters such as butyl maleate, propyl maleate, ethyl maleate and cyclohexyl maleate, and acid anhydrides such as maleic anhydride and citraconic anhydride may also be suitable candidates as comonomers under this disclosure.

Examples of acrylamides suitable as comonomers include acrylamide, N-methylacrylamide, N-ethylacrylamide, 2-hydroxyethyl-acrylamide, N,N-diethylacrylamide, acryloylmorpholine, N,N-dimethylaminopropylacrylamide, isopropylacrylamide, N-methylolacrylamide, sulfophenylacrylamide, 2-acrylamido-2-methylpropanesulfonic acid, 2-acrylamido-1-methylsulfonic acid, diacetoneacrylamide and acrylamidoalkyltrialkylammonium chloride, methacrylamides such as methacrylamide, N-methylmethacrylamide, N-ethylmethacrylamide, 2-hydroxyethylmeth-acrylamide, N,N-diethylmethacrylamide, N,N-di-methylmethacrylamide, N-methylolmethacrylamide, methacryloylmorpholine, N,N-dimethylaminopropylmethacrylamide, iso-propylmethacrylamide, 2-methacrylamido-2-methylpropanesulfonic acid and methacrylamidoalkyltrialkylammonium chloride.

In addition, vinylpyrrolidone, sulfophenyl-itaconimide, acrylonitrile, methacrylonitrile, fumaronitrile, α-cyanoethyl acrylate, citraconic acid, citraconic anhydride, vinyl acetate, vinyl propionate, vinyl pivalate, vinyl versatate, crotonic acid, itaconic acid, fumaric acid, maleic acid, mono-2-(methacryloyloxy)ethyl phthalate, mono-2-(methacryloyloxy)ethyl succinate, mono-2-(acryloyloxy)ethyl succinate, methacryloxypropyltri-methoxysilane, methacryloxypropyldimethoxysilane, acrolein, vinyl methyl ketone, N-vinylacetamide, N-vinylformamide, vinyl ethyl ketone, vinylsulfonic acid, allylsulfonic acid, dehydroalanine, sulfur dioxide, isobutene, N-vinylcarbazole, vinylidene dicyanide, p-quinodimethane, chlorotrifluoroethylene, tetrafluoroethylene, norbomene, N-vinylcarbazole, acrylic acid, methacrylic acid and the like may also be co monomers under this disclosure.

Among these, in view of polymerizability with p-styrenesulfonic acid (salt), availability and the like, preferred are methacrylic acid (salt), methyl methacrylate, 2-hydroxyethyl methacrylate, glycidyl methacrylate, maleic anhydride, maleic acid (salt), N-phenylmaleimide, N-cyclohexylmaleimide, methacrylamide, methacryloylmorpholine, styrene and styrene derivatives.

Traditional support materials soluble in an alkali bath are difficult to remove and slow to dissolve. They typically require a hot stirred bath (110 F and higher), at a pH of greater than 9, and a long soaking period. It would not be uncommon to soak a finished part/support item for 8-12 hours, depending on geometry, before the support material would begin to degrade enough to remove the supports. With the use of the inventive formulation, alkaline solution is not required, a hot bath is not required (although it will help accelerate dispersal). With heat applied, the timeframe for support removal will be less than an hour, and preferably, 15 minutes or less, depending on geometry.

Although the present disclosure has been described with reference to preferred embodiments, workers skilled in the art will recognize that changes may be made in form and detail without departing from the spirit and scope of the disclosure.

What is claimed:

1. A method of additive manufacturing a soluble support structure to support a part printed from a thermoplastic build material, the method comprising:
extruding or depositing by electrophotography a water-dispersible sulfonated thermoplastic copolymer provided as a consumable feedstock, the water-dispersible sulfonated thermoplastic copolymer produced from a reaction product of a monomer A and a monomer B forming a primary carbon chain, wherein the monomer A contains a pendant functional group extending from the primary carbon chain and comprises an acid group or an anhydride group; and wherein the reaction product comprises at least 18 mol % of the monomer A, and wherein a sulfonate salt consisting of sodium sulfonate salt, ammonium sulfonate salt, or lithium sulfonate salt is reacted onto some or all of the pendant functional groups of the reaction product to produce the water-dispersible sulfonated thermoplastic copolymer containing at least 18 mol % of the sulfonated monomer A by one of the following reactions:
esterifying the acid group of the reaction product with a hydroxyl-functionalized sulfonate salt of the sulfonate salt,
amidizing the acid group of the reaction product with an amine sulfonate salt of the sulfonate salt, or
imidizing the anhydride group of the reaction product with the amine sulfonate salt of the sulfonate salt;
wherein the sulfonated monomer A in the water-dispersible sulfonated thermoplastic copolymer is at least 18 mol % but not more than 40 mol %, and the water-dispersible sulfonated thermoplastic copolymer has a glass transition temperature of at least 45° C., is melt-extrudable; and
separating the water-dispersible sulfonated thermoplastic copolymer from the part by subjecting the water-dispersible sulfonated thermoplastic copolymer to ambient temperature water without aid of any other solubility or dispersibility adjuvant.

2. The method of claim 1, wherein the monomer A is methacrylic acid and the monomer B is methyl methacrylate and wherein the reaction is the amidization.

3. The method of 1, wherein the monomer A is maleic anhydride and the monomer B is styrene, and wherein the reaction is the imidization.

4. The method of claim 1, and further comprising a step of printing the part from the thermoplastic build material selected from a group consisting of polyesters, polyamides, polyimides, polycarbonates, polysulfones, and polyetherimides.

5. The method of claim 1, wherein the hydroxyl-functionalized sulfonate salt comprises 4-hydroxybenzenesulfonate, and wherein the amine sulfonate salt comprises sodium sulfanilate.

6. The method of claim 1, wherein the water-dispersible sulfonated thermoplastic copolymer has a charge density of at least about 0.4 meq./g, suitable to exhibit water solubility or water-dispersibility.

7. A method of additive manufacturing a soluble support structure to support a part printed from a thermoplastic build material, the method comprising:
depositing by electrophotography a water-dispersible sulfonated thermoplastic copolymer provided as a toner powder consumable feedstock in a layer-wise manner proximate a layer of the thermoplastic build material used to print the part, the water-dispersible sulfonated thermoplastic copolymer produced from a reaction product of a monomer A and a monomer B forming a primary carbon chain, wherein the monomer A contains a pendant functional group extending from the primary carbon chain and comprises an acid group or an anhydride group; and wherein the reaction product comprises at least 18 mol % of the monomer A, and wherein a sulfonate salt consisting of sodium sulfonate salt, ammonium sulfonate salt, or lithium sulfonate salt is reacted onto some or all of the pendant functional groups of the reaction product to produce the water-dispersible sulfonated thermoplastic copolymer containing at least 18 mol % of the sulfonated monomer A by one of the following reactions:
esterifying the acid group of the reaction product with a hydroxyl-functionalized sulfonate salt of the sulfonate salt,
amidizing the acid group of the reaction product with an amine sulfonate salt of the sulfonate salt, or
imidizing the anhydride group of the reaction product with the amine sulfonate salt of the sulfonate salt;
transfusing the deposited water-dispersible sulfonated thermoplastic copolymer to the layer of the thermoplastic build material used to print the part; wherein the sulfonated monomer A in the water-dispersible sulfonated thermoplastic copolymer is at least 18 mol % but not more than 40 mol %, and the water-dispersible sulfonated thermoplastic copolymer has a glass transition temperature of at least 45° C., is melt-extrudable; and
separating the water-dispersible sulfonated thermoplastic copolymer from the part by subjecting the water-dispersible sulfonated thermoplastic copolymer to ambient temperature water without aid of any other solubility or dispersibility adjuvant.

8. The method of claim 7, wherein the monomer A is methacrylic acid and the monomer B is methyl methacrylate and wherein the reaction is the amidization.

9. The method of 7, wherein the monomer A is maleic anhydride and the monomer B is styrene, and wherein the reaction is the imidization.

10. The method of claim 7, wherein the hydroxyl-functionalized sulfonate salt comprises 4-hydroxybenzenesulfonate, and wherein the amine sulfonate salt comprises sodium sulfanilate.

11. The method of claim 7, wherein the water-dispersible sulfonated thermoplastic copolymer has a charge density of at least about 0.4 meq./g, suitable to exhibit water solubility or water-dispersibility.

12. A method of additive manufacturing a soluble support structure to support a part printed from a thermoplastic build material, the method comprising:
extruding a water-dispersible sulfonated thermoplastic copolymer provided as a consumable feedstock, the water-dispersible sulfonated thermoplastic copolymer produced from a reaction product of a monomer A and a monomer B forming a primary carbon chain, wherein the monomer A contains a pendant functional group extending from the primary carbon chain and comprises an acid group or an anhydride group; and wherein the reaction product comprises at least 18 mol % of the monomer A, and wherein sulfonate salt consisting of sodium sulfonate salt, ammonium sulfonate salt, or lithium sulfonate salt is reacted onto some or all of the pendant functional groups of the reaction product to produce the water-dispersible sulfonated thermoplastic copolymer containing at least 18 mol % of the sulfonated monomer A by one of the following reactions:

esterifying the acid group of the reaction product with a hydroxyl-functionalized sulfonate salt of the sulfonate salt, amidizing the acid group of the reaction product with an amine sulfonate salt of the sulfonate salt, or imidizing the anhydride group of the reaction product with the amine sulfonate salt of the sulfonate salt;

wherein the sulfonated monomer A in the water-dispersible sulfonated thermoplastic copolymer is at least 18 mol % but not more than 40 mol %, and the water-dispersible sulfonated thermoplastic copolymer has a glass transition temperature of at least 45° C., is melt-extrudable; and separating the water-dispersible sulfonated thermoplastic copolymer from the part by subjecting the water-dispersible sulfonated thermoplastic copolymer to ambient temperature water without aid of any other solubility or dispersibility adjuvant.

13. The method of claim 12, wherein the monomer A is methacrylic acid and the monomer B is methyl methacrylate and wherein the reaction is the amidization.

14. The method of 12, wherein the monomer A is maleic anhydride and the monomer B is styrene, and wherein the reaction is the imidization.

15. The method of claim 12, wherein the hydroxyl-functionalized sulfonate salt comprises 4-hydroxybenzene-sulfonate, and wherein the amine sulfonate salt comprises sodium sulfanilate.

16. The method of claim 12, wherein the water-dispersible sulfonated thermoplastic copolymer has a charge density of at least about 0.4 meq./g, suitable to exhibit water solubility or water-dispersibility.

* * * * *